United States Patent [19]

Blotenberg et al.

[11] Patent Number: 5,099,411
[45] Date of Patent: Mar. 24, 1992

[54] DIGITAL METHOD OF CONTROLLING AND REGULATING A TURBINE THAT HAS GAS OR STEAM FLOWING THROUGH IT AND DEVICE FOR CARRYING OUT THE METHOD

[75] Inventors: Wilfried Blotenberg, Dinslaken; Bernard Gebhardt; Ulrich Gebhardt, both of Schwelm, all of Fed. Rep. of Germany

[73] Assignee: MAN Gutehoffnungshütte AG, Oberhausen, Fed. Rep. of Germany

[21] Appl. No.: 460,562

[22] Filed: Jan. 3, 1990

[30] Foreign Application Priority Data

Jan. 14, 1989 [EP] European Pat. Off. ........ 89100637.1

[51] Int. Cl.⁵ .................... G06F 15/46; G06F 15/16
[52] U.S. Cl. ................................. 364/133; 364/180; 364/187; 364/494
[58] Field of Search ................... 364/131–137, 364/492–495, 180–182, 184–187

[56] References Cited

U.S. PATENT DOCUMENTS

| | | | |
|---|---|---|---|
| 3,377,623 | 4/1968 | Reut et al. | 364/133 X |
| 3,578,958 | 5/1971 | Richardson | 364/135 X |
| 3,931,500 | 1/1976 | Berebile et al. | 364/135 X |
| 4,013,877 | 3/1977 | Uram et al. | 364/135 |
| 4,058,711 | 11/1977 | Ondercin et al. | 364/133 |

Primary Examiner—Joseph Ruggiero
Attorney, Agent, or Firm—Max Fogiel

[57] ABSTRACT

A digital arrangement for controlling a gas or steam turbine in which operating parameters of the turbine are sensed at a regular rate. Control parameters are then calculated from the operating parameters by at least one control and regulating program with predetermined reference values. The turbine is controlled and monitored in operation, in accordance with the calculated control parameters for the purpose of safeguarding against excess speed or surging. At least two computer systems are operated in parallel and at different speeds, and communications prevail between these two computer systems. The first of the computer systems is operated at a substantially rapid rate and with a limited supply of commands, together with an individual control and regulating program having a set of reference values. The second computer system is operated at a slower rate than the first computer system and with a greater supply of commands. The second computer system is operated with a plurality of control and regulating approaches and sets of reference values. Predetermined operating parameters are acquired by the first computer system for calculating control parameters and transmitting the calculated control parameters to the turbine. A new control and regulating program is selected by the second computer system when operation of the turbine is changed.

15 Claims, 1 Drawing Sheet

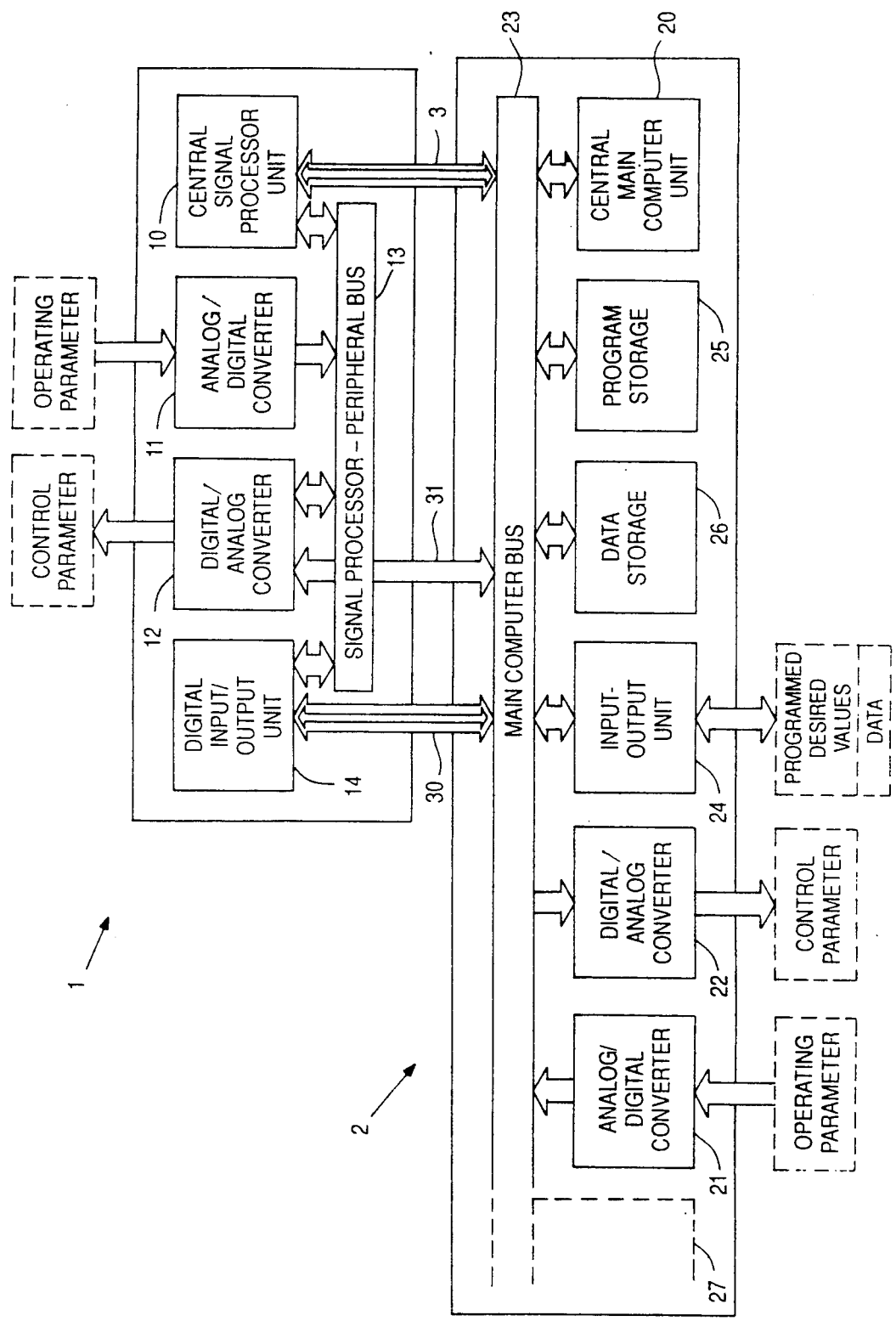

DIGITAL METHOD OF CONTROLLING AND REGULATING A TURBINE THAT HAS GAS OR STEAM FLOWING THROUGH IT AND DEVICE FOR CARRYING OUT THE METHOD

BACKGROUND OF THE INVENTION

Various regulating methods of this type are known from the field of process control. They can be classified as either analog or digital. Although analog methods respond practically without delay, they are not very flexible. Digital methods are more flexible but, due to their inherent sampling times, can respond only subsequent to a certain delay. Such delays are a great drawback in the operation of turbines because they demand an increase in the margins of safety in relation to dangerous or impermissible operating states, restricting the exploitable operating range of the turbine. The restrictions in response time can to some extent be avoided by employing a digital method of control and regulation that uses a microprocessor system programmed in an assembler language. One drawback is that flexibility is again powerfully decreased and that programming in assembler language is very expensive and demands highly specialized skills.

German Patent 3 105 376 discloses a regulating method that represents a combination of analog and digital approaches. The basic regulation is accomplished with an analog regulator with output signals that are corrected by a supplementary regulator. The corrections optimize the regulating characteristic. The analog regulation is designed to ensure that the blow-off curve is straight and at a constant distance from the turbine's surge limit, enabling reliable operation even when the digital system breaks down. What can be considered a drawback to this method is that combining analog and digital signals requires complicated circuitry. Furthermore, the digital system in this case cannot assume the regulating process on its own when the analog regulator breaks down.

SUMMARY OF THE INVENTION

One object of the invention is accordingly to create a digital control and regulating method of the aforesaid type that would not only be easy to operate, highly flexible, and reliable, but would also exhibit only very short response times. Another object of the invention is a device for carrying out the method.

The method in accordance with the invention satisfies demands that have previously seemed impossible to combine in that two parallel computer systems are employed, operating in conjunction and each assuming special assignments. The rapid computer system handles brief response delays, whereas easy operation and high flexibility are ensured by the second computer system with its comprehensive supply of commands. One result for example is the possibility of employing a higher-level and easier-to-learn programming language. That the first and rapid-action computer system has only a limited supply of commands is no drawback because the second computer system can always load a new program and set of reference values into the first computer system when necessary. Nor is the slower rate of the second computer system a drawback in this new method because the second computer system does not have to assume control and regulating assignments that demand rapid response during the normal course of operations.

Beyond the aforesaid advantages, the new method also provides an extensive potential for monitoring errors while the method is in operation. In one embodiment of the method, the second and slower computer system obtains at least the detected operating parameters and the calculated control parameters for one computing cycle and optionally the control and regulating program and the set of reference values at prescribed intervals of time from the first and more rapid computer system, recalculates the control parameters, compares the recalculated control parameters with the control parameters previously calculated by the first computer system and, when there is a discrepancy that exceeds a certain threshold, triggers an alarm. Although the recalculation by the second computer system takes longer than the calculation previously carried out by the first computer system, errors in the course of operations will still be recognized early enough because the recalculation still takes less time than it would take for instruments mounted on the turbine and detecting its operating parameters to recognize errors.

To avoid premature triggering of the alarm, accompanied by unnecessary interruptions of or malfunctions in the operations, the second computer system again obtains at least the operating parameters and the calculated control parameters from the first computer system and carries out at least one additional recalculation subsequent to every recalculation resulting in a discrepancy that exceeds a certain threshold and no alarm is triggered until at least two succeeding recalculations have resulted in a discrepancy that exceeds a certain threshold.

In another approach to monitoring the method for errors in its operations, the second and slower computer system obtains at prescribed intervals and for a prescribed length of time a sequence of values representing one or more of the operating parameters detected by the first and more rapid computer system and/or of the calculated control parameters, calculates their gradients, and triggers an alarm when a prescribed or technically prescribable gradient threshold is exceeded. This embodiment of the method exploits the fact that, since specific turbine-operating parameters and specific states of the controls on the turbine can vary only in accordance with specific maximum chronological gradients, exceeding them represents an error in the method's operation. Some examples of appropriate operating parameters are the speed of the turbine, which, due to the inertia of the rotating components, can vary even at full load only in accordance with a limited maximum chronological gradient, the pressure and flow through a turbocompressor, and the temperature of the compressed medium, which, due to the dynamics of the gas being circulated within a closed pipeline network, can also vary only in accordance with a limited gradient. The control parameters calculated by the computer system are in themselves not subject to a gradient limit, although it is possible to provide a limit in the control and regulating program in order to adjust the maximum control-parameter gradients to the rate at which the controls can be varied. The calculated control parameters can also be included in this monitoring process.

In still another control potential, the first computer system emits a setting pulse to the second computer system at prescribed and preferably constant intervals of time and the second computer system monitors the incoming setting pulses for chronological uniformity and triggers an alarm when they arrive at irregular intervals or do not arrive. Although this embodiment of the method represents only indirect monitoring, it predicts the presence of errors in the course of operation with high probability and also offers the advantage of high speed and low expense.

Once the alarm has been triggered, the second and slower computer system in one embodiment of the invention can activate a turn-off program and retract and turn off the turbine in a regulated way. This prevents damage to the turbine, although operations are interrupted.

The second and slower computer system assumes control and regulation of the turbine in another embodiment of the method once the alarm has been triggered. This embodiment avoids a complete discontinuation of operations although there is an increased risk in that the response rate of the control and regulating method is decreased.

To counteract this last drawback, the margins of safety in relation to dangerous operating states are increased by loading appropriately modified reference-value sets when the second computer system assumes control and regulation of the turbine. This measure ensures reliability by preventing operations at the limits of danger or impermissibility.

To eliminate stopping the turbine unnecessarily and controlling and regulating it unnecessarily long with the second and slower computer system, the first computer system is loaded, once the second computer system has assumed control and regulation of the turbine, with a test program that matches the control and regulation program running in the second computer system and cyclically repeats the second computer system's calculation of the control parameters and, when the results of both of the control-parameter calculations in one cycle or in several succeeding cycles are equal, an appropriate control and regulation program is loaded along with a set of reference values into the first computer system, which resumes control and regulation of the turbine. It is ensured in this context either that operations return to normal or, if irregularities continue to occur, that operations are maintained at satisfactory although not optimum level until the errors can be diagnosed again.

When the results of the control-parameter calculations obtained by the first computer system do not agree with those obtained by the second in this control and regulation method, the parameters that ensure that the turbine will operate at a state that is farther from the dangerous or impermissible operating states are selected from the parallelly calculated control parameters and emitted. The one of the two parallelly calculated parameters can be selected either inside one of the two computer systems or independently in a downstream selecting unit. One particular result is that, when the discrepancies between the results of the two calculations are slight, the compressor can continue to operate and does not need to be stopped unnecessarily.

In still another variation of the system, the first and more rapid computer system is employed in a multiple embodiment, the second and slower computer system is employed in a simple embodiment as an overall main computer for the rapid computer system, the second computer system recalculates the control parameters calculated by the first and more rapid computer system at cyclical intervals, preferably in sequence, and, when the first and more rapid computer systems fail, their function is assumed subject to mediation by the second computer system by one or more of the remaining first and more rapid computer systems. This combination of a main computer with several rapid computer systems, preferably signal processors, allows the assignment of calculating the control parameters to be distributed among the individual rapid computer systems, with each assuming a limited number of subsidiary assignments. When one of the rapid computer systems fails, its subsidiary assignments are surrendered and assumed by one or more of the other computer systems, so that the response rate on the whole is hardly decreased, ensuring very high operating reliability.

Finally, in the last embodiment of the method, the second computer system emits setting pulses to the first computer system or systems at prescribed and preferably constant intervals of time, the first computer system or systems monitors the arriving setting pulses for chronological uniformity and triggers an alarm when they arrive at irregular intervals or do not arrive and the first computer system or systems continues to operate with whatever control and regulating program has been loaded into it along with a set of reference values until the second computer system again receives regular setting pulses from the second computer system. The result is control in the opposite direction as well, with the more rapid computer system also monitoring the slower computer system, ensuring that the turbine can continue to operate even when the main computer fails, when the turbine's operation cannot or should not be modified.

The second object of the invention is attained with a device in which the method described herein is carried out reliably and provides the peripherals necessary not only for internal communications and communications between the two computer systems but also for communications with the equipment that monitors and adjusts the turbine.

The use of two computer systems ensures total redundancy on the part of the calculating systems. When one computer system fails, the other can, subject of course to certain restrictions, assume all its functions and accordingly ensure continued although limited operation of the turbine. One particular advantage is that, since the two computer systems are different, the possibility of failure of the overall control and regulation device as the result of system error is extensively eliminated. Even if one of the computer systems contains a systematic error, the other computer system, which derives of course from a completely different manufacturer, will very probably not contain the same error.

In one advantageous development of the device, the communications interface between the central signal-processing unit and the main-computer bus is a random-access memory (dual-port RAM) that allows access from either side. The particular advantage of this interface is that the access-time points and durations are random and that completely independent bilateral access times are possible.

To provide additional communications between the two computer systems, the first computer system also has an additional interface between the first and the second computer system in the form of a digital input-and-output unit connected not only to the signal-processor peripherals bus but also to the main-computer bus.

BRIEF DESCRIPTION OF THE DRAWINGS

One embodiment of the device will now be described with reference to the drawing, which is a schematic block diagram of a control and regulation device, in accordance with the present invention.

DESCRIPTION OF THE PREFERRED EMBODIMENTS

As will be evident from the FIGURE, an embodiment of the control and regulation device consists of a first computer system 1 and of a second computer system 2. The first computer system in this case is a signal processor that includes a central signal-processing unit 10, an analog-to-digital converter 11, a digital-to-analog converter 12, a signal-processor peripherals bus 13, and a digital input-and-output unit 14. Communications between central signal-processing unit 10 and the aforesaid peripherals occurs by way of signal-processor peripherals bus 13. Analog-to-digital converter 11 obtains operating parameter from an associated turbine. The parameters are supplied by instruments that are in themselves known. Digital-to-analog converter 12 on the other hand emits control parameters to equipment that is in itself known and controls the turbine.

Second computer system 2, which acts in the capacity of a main computer in this case, comprises a central main-computer unit 20, a program memory 25, a data memory 26, an input-and-output unit 24, a digital-to-analog converter 22, an analog-to-digital converter 21, and a main-computer bus 23. Second computer system 2 can also have addition peripherals 27. Internal communications inside second computer system 2, especially that is to say communications between central main-computer unit 20 and the aforesaid peripherals, occurs in this case by way of main-computer bus 23. The analog-to-digital converter 21 in second computer system 2 is also employed to obtain operating parameters from the turbine, and the digital-to-analog converter 22 to emit control parameters to the turbine. Input-and-output unit 24 is employed for inputing and outputing programs and references as well as various data.

Communications between computer systems 1 and 2 occurs by way of two channels. There is a communications interface 3 between central signal-processing unit 10 and main-computer bus 23. This interface consists preferably of a random-access memory that allows access from both sides. Another communications interface 30 exists between the digital input-and-output unit 14 in first computer system 1 and the main-computer bus 23 in second computer system 2. The purpose of interface 30 is to transmit binary signals back and forth over the shortest possible channel between digital input-and-output unit 14 and second computer system 2.

Finally, the FIGURE illustrates another direct connection 31 between main-computer bus 23 and the digital-to-analog converter 12 in first computer system 1. Connection 31 allows the slower working second computer system 2 to also transmit the control parameters it calculates directly to the output terminal of first computer system 1 with no need for external signal switching.

A combination computer system of this type can be used in practice to obtain cycle times of less than 1 msec at first computer system 1. The overall system also ensures easy operation because second computer system 2 provides a comprehensive supply of commands and data.

We claim:

1. A digital method for controlling and regulating a turbine having gas or steam flowing therethrough, a turbocompressor or helical compressor, a gas or steam turbine, or a residual-gas expander, comprising the steps of: sensing at a regular rate turbine operating parameters as speed, volumetric flow, intake pressure, exit pressure temperature of gas or steam, or the like; calculating control parameters from said operating parameters by at least one control and regulating program with predetermined reference values; controlling and monitoring operation of the turbine in accordance with the calculated control parameters for safeguarding against excess speed or surging, said control parameters being an intake valve setting, a blade setting, fuel level, blow-off valve setting, and the like; operating at least two computer systems in parallel and at different speeds; establishing communications between said at least two computer systems; operating a first one of said computer systems at a substantially rapid rate with a limited supply of commands and with an individual control and regulating program having a set of reference values; operating a second one of said computer systems at a slower rate than said first computer system and greater supply of commands than said first computer system, said second computer system being operated with a plurality of control and regulating programs and sets of reference values; acquiring predetermined operating parameters by said first computer system for calculating control parameters and transmitting the control parameters to said turbine; and selecting a predetermined new control and regulating program by said second computer system when operation of said turbine is changed.

2. A digital method as defined in claim 1, wherein said second computer system receives at least the operating parameters and calculated control parameters for one computing cycle and optionally the control and regulating program and set of reference values at predetermined intervals of time from said first computer system; recalculating by said second computer system the control parameters; comparing the recalculated control parameters with the control parameters previously calculated by said first computer system; and triggering an alarm by said second computer system when there is a discrepancy between values calculated by said first computer system and recalculated values by said second computer system exceeding a predetermined threshold.

3. A digital method as defined in claim 2, including the step of: carrying out at least one additional recalculation by said second computer system subsequent to every recalculation resulting in a discrepancy exceeding said threshold; and triggering said alarm only after at least two succeeding recalculations have resulted in a discrepancy exceeding said threshold.

4. A digital method as defined in claim 1, wherein said second computer system receives at predetermined intervals and for a predetermined length of time a sequence of values representing at least one of said operating parameters from said first computer system; calculating gradients of said at least one operating parameter; and triggering an alarm when a predetermined gradient threshold is exceeded.

5. A digital method as defined in claim 1, wherein said first computer system transmits a setting pulse to said second computer system at predetermined constant intervals of time; monitoring by said second computer system setting pulses received by said second computer system for chronological uniformity; and triggering an alarm when setting pulses arrive at irregular intervals or fail to arrive at said second computer system.

6. A digital method as defined in claim 2, including the step of activating a turn-off program and retracting and turning off the turbine in a regulated step by said second computer system upon triggering said alarm.

7. A digital method as defined in claim 2, wherein said second computer system controls and regulates the turbine upon triggering said alarm.

8. A digital method as defined in claim 7, wherein margins of safety in relation to dangerous operating states of the turbine are increased by loading modified reference-value sets when said second computer system controls and regulates the turbine.

9. A digital method as defined in claim 7, including the steps of: loading said first computer system with a test program matching a control and regulating program running in said second computer system when said second computer system controls and regulates the turbine; repeating cyclically the calculation of said second computer system for said control parameters; and loading a control and regulation program with a set of reference values into said first computer system for resuming control and regulation of the turbine by said first computer system when results of both calculations of control parameters in one cycle or in a plurality of succeeding cycles are equal.

10. A digital method as defined in claim 2, including the step of selecting parallel-calculated control parameters for operating the turbine at a state remote from dangerous operating states when calculations of the control parameters by said first computer system disagree with corresponding calculations by said second computer system.

11. A digital method as defined in claim 1, wherein said first computer system has a plurality of first computer units in said second computer system is an overall main computer for said computer units; recalculating with said second computer system the control parameters calculated by said first computer system at cyclical intervals in sequence; and carrying out functions of a computer unit that has failed by at least one of the remaining computer units with dependency on said second computer system.

12. A digital method as defined in claim 1, including the step of emitting setting pulses from said second computer system to said first computer system at predetermined constant intervals of time; monitoring with said first computer system arrival of said setting pulses for chronological uniformity; triggering an alarm when said setting pulses arrive at irregular intervals or fail to arrive at said first computer system; and continuing operation of said first computer system with the control and regulating program previously loaded into said first computer system together with a set of reference values until said first computer system receives again regular setting pulses from said second computer system.

13. A digital arrangement for controlling and regulating a turbine having gas or steam flowing therethrough, a turbocompressor or helical compressor, a gas or steam turbine, or a residual-gas expander, comprising: means for sensing at a regular rate turbine operating parameters as speed, volumetric flow, intake pressure, exit pressure temperature of gas or steam, or the like; means for calculating control parameters from said operating parameters by at least one control and regulating program with predetermined reference values; means for controlling and monitoring operation of the turbine in accordance with the calculated control parameters for safeguarding against excess speed or surging, said control parameters being an intake valve setting, a blade setting, fuel level, blow-off valve setting, and the like; at least two computer systems for operating in parallel and at different speeds; said at least two computer systems communicating between each other; a first one of said computer systems for operating at a substantially rapid rate with a limited supply of commands and with an individual control and regulating program having a set of reference values; a second one of said computer systems for operating at a slower rate than said first computer system and greater supply of commands than said first computer system, said second computer system operating with a plurality of control and regulating programs and sets of reference values; said first computer system acquiring predetermined operating parameters for calculating control parameters and transmitting the control parameters to said turbine; said second computer system selecting a predetermined new control and regulating program when operation of said turbine is changed; means for coupling together said first computer system and said second computer system; said first computer system comprising a signal processor having a central signal processing unit; at least one analog-to-digital converter and digital-to-analog converter connected to said central signal processing unit; and a signal-processor peripherals bus in said signal processor; said second computer system comprising a main computer having a central main-computer unit; additional program and data memories loadable in said central main-computer unit; an input-and-output unit in said main computer unit; at least one analog-to-digital converter and digital-to-analog converter in said main-computer unit; a main-computer bus in said main computer; and at least one communications interface means between said central signal-processing unit and said main-computer bus.

14. A digital arrangement as defined in claim 13, wherein said communications interface means comprises a dual-port random-access memory allowing access from either side thereof.

15. A digital arrangement as defined in claim 13, including an additional interface means between said first computer system and said second computer system and comprising a digital input-and-output unit connected to both said signal-processor peripherals bus and said main-computer bus.

* * * * *